United States Patent [19]
Ember

[11] 3,864,403
[45] Feb. 4, 1975

[54] PREPARATION OF 6-METHYL-5-HEPTEN-2-ONE
[75] Inventor: George Ember, Hackensack, N.J.
[73] Assignee: Hoffmann-La Roche Inc., Nutley, N.J.
[22] Filed: Aug. 10, 1973
[21] Appl. No.: 387,554

[52] U.S. Cl. ............................................. 260/593 R
[51] Int. Cl. ............................................. C07c 49/04
[58] Field of Search ................................. 260/593 R

[56] References Cited
UNITED STATES PATENTS
3,658,911  4/1972  Pommer ......................... 260/593 R
3,686,321  8/1972  Mueller .......................... 260/593 R OTHER PUBLICATIONS
Higginbottom, Reactions of Organic Compounds, pp. 60.

Primary Examiner—Leon Zitver
Assistant Examiner—James H. Reamer
Attorney, Agent, or Firm—Samuel L. Welt; Jon S. Saxe; William H. Epstein

[57]  ABSTRACT

6-Methyl-5-hepten-2-one is obtained by heating a reaction mixture, which contains, 2,2,6-trimethyl-3,4-dihydropyran, 6-methyl-6-hepten-2-one or a mixture thereof and 0.001 to 0.5 weight percent of a strong acid, an ester of a strong acid or a mixture thereof, to a temperature of 100°C. to 300°C. at a pressure at or above the vapor pressure of the reaction mixture.

9 Claims, No Drawings

PREPARATION OF 6-METHYL-5-HEPTEN-2-ONE

BACKGROUND OF THE INVENTION

This application relates to the production of 6-methyl-5-hepten-2-one by isomerizing 6-methyl-6-hepten-2-one, by cracking 2,2,6-trimethyl-3,4-dihydropyran, and by isomerizing and cracking in one process step.

6-Methyl-5-hepten-2-one is a valuable intermediate in the production of useful odorants and carotenoid compounds. This compound has heretofore been prepared by heating 2,2,6-trimethyl-3,4-dihydropyran at high temperatures, in the presence of water (See U.S. Pat. No. 3,597,484) or isobutylene (See U.S. Pat. No. 3,686,321), or by heating 6-methyl-6-hepten-2-one at elevated temperatures in the presence of iron pentacarbonyl (See U.S. Pat. No. 3,658,911) or palladium (See U.S. Pat. No. 3,670,028). However, the yields of 6-methyl-5-hepten-2-one from such processes have been relatively low, unless long and/or cumbersome reaction procedures have been utilized. Moreover, such processes have been unsuitable for providing 6-methyl-5-heptene- in high yields from a mixture of 6-methyl-6-hepten-2-one and 2,2,6-trimethyl-3,4-dihydropyran, such as is obtained by the procedure described in Example 1 of U.S. Pat. No. 2,628,252.

There has been a need, therefore, for an improved process for preparing 6-methyl-5-hepten-2-one from 6-methyl-6-hepten-2-one, 2,2,6-trimethyl-3,4-dihydropyran, and mixtures thereof.

SUMMARY OF THE INVENTION

In accordance with the process of this invention, 6-methyl-5-hepten-2-one is obtained by heating a reaction mixture, containing:

a. 2,2,6-trimethyl-3,4-dihydropyran, 6-methyl-6-hepten-2-one or a mixture thereof, and b. .001 to 0.5 weight percent of a strong acid, an ester of a strong acid or a mixture thereof, to a temperature of 100°C. to 300°C. at a pressure at or above the vapor pressure of the reaction mixture. By this process, yields of about 95 percent are obtained based on consumed 2,2,6-trimethyl-3,4-dihydropyran, 6-methyl-6-hepten-2-one or mixture thereof.

DETAILED DESCRIPTION OF THE INVENTION

By the process of this invention, 6-methyl-5-hepten-2-one (hereinafter referred to as the "methyl-5-heptenone") can be obtained by heating a reaction mixture, which contains 2,2,6-trimethyl-3,4-dihydropyran (hereinafter referred to as the "pyran"), 6-methyl-6-hepten-2-one (hereinafter referred to as the "methyl-6-heptenone") or a mixture thereof, and 0.001 to 0.5 weight percent (percent) of at least one strong acid, at least one ester of a strong acid or a mixture thereof, to a temperature of 100°C. to 300°C. at a pressure at or above the vapor pressure of the reaction mixture. In this process, the weight percent (percent) of the acid, the ester, or the mixture thereof is based on the reaction mixture, which comprises the acid, or the ester or the mixture thereof and the pyran, the methyl-6-heptenone, or the mixture thereof.

In carrying out this process, it is preferred that between about 0.005 and 0.2 percent of the acid and/or the ester, especially between about 0.01 and 0.1 percent of the acid and/or the ester, be utilized in the reaction mixture. Also herein, the ratio of the acid and the ester in the mixture thereof is not critical. However, in this process, the use of an acid without an ester is particularly preferred, particularly about 0.02 percent acid.

In the process of this application, the pyran can be converted to the methyl-5-heptenone by heating a reaction mixture consisting essentially of the pyran and the acid, the ester or the mixture thereof. If desired, this mixture can also contain one or more inert solvents as diluents.

Also in this process, the methyl-6-heptenone can be converted to the methyl-5-heptenone by heating a reaction mixture consisting essentially of the methyl-6-heptenone and the acid and/or the ester. If desired, this mixture can also contain one or more inert solvents as diluents.

Further in this process, a mixture of the pyran and the methyl-6-heptenone can be converted to the methyl-5-heptenone by heating a reaction mixture consisting essentially of the pyran, the methyl-6-heptenone and the acid and/or the ester. If desired, this mixture can also contain one or more inert solvents as diluents. In carrying out this process, the ratio of pyran and methyl-6-heptenone in the reaction mixture is not critical, and any ratio of these reactants can be conveniently utilized to form methyl-5-heptenone.

In the process herein, any conventionl, inert solvent in which the pyran and/or the methyl-6-heptenone and the strong acid or the ester of the strong acid are soluble can be utilized. Among the inert solvents which can be utilized, either individually or in a mixture of solvents, are: the lower alkanols, such as methanol, ethanol and isopropanol; the ketones, such as acetone and methyl ethyl ketone; the cyclic ethers such as tetrahydrofuran and dioxane; and the chlorinated hydrocarbons such as tetrachloroethane, trichloroethylene and chlorobenzene. The inert solvent can be present in trace or larger amounts. Preferably, this reaction is carried out without using any inert solvent. In this process, the pyran, the methyl-6-heptenone or the mixture thereof can also contain trace or larger amounts of other materials, such as diacetone alcohol and mesityl oxide, and trace amounts of materials such as methyl vinyl ketone.

In carrying out this process, the reaction mixture containing the pyran, the methyl-6-heptenone or the mixture thereof and the acid, the ester or the mixture thereof can contain up to about 90 percent by weight of one or more inert solvents and other diluent materials. Preferably, in carrying out this process, the reaction mixture consists essentially of the pyran, the methyl-6-heptenone, or the mixture thereof and the acid and/or ester.

In carrying out the process of this invention, any conventional strong acid having a dissociation constant (in water at 25°C.) of greater than about $10^{-4}$ can be utilized. Among the strong acids which can be utilized, either individually or in combination, are the mineral acids, such as sulfuric acid, sulfurous acid, hydrochloric acid, perchloric acid, hydrobromic acid, hydroiodic acid and phosphoric acid, and the strong organic acids, such as formic acid, oxalic acid, trichloroacetic acid and the sulfonic acids, Among the foregoing strong acids, preferred for use in the process of this invention are the sulfonic acids. The preferred sulfonic acids include the aliphatic sulfonic acids, especially the lower alkyl sulfonic acids, such as methanesulfonic acid, ethanesulfonic acid, 1-propanesulfonic acid, 2-propanesulfonic acid, and trifluoromethanesulfonic acid; the alicyclic sulfonic acids, such as camphorsulfonic acid; and the aromatic sulfonic acids such as paratoluenesulfonic acid, naphthalene-1-sulfonic acid, naphthalene-2-sulfonic acid, benzenesulfonic acid, p-nitrophenylsulfonic acid and 4-chlorobenzenesulfonic acid. Among the foregoing sulfonic acids, particularly preferred in the process of this invention is paratoluenesulfonic acid.

In the process of this invention, any ester of one of the foregoing strong acids which is soluble in the methyl-6-heptenone, the pyran or a mixture thereof to the extent of at least 0.001 to 0.5 percent can be utilized. Preferred esters include the lower alkyl and phenyl lower alkyl esters of the strong organic acids. As used herein, the term "lower alkyl" comprehends straight chain and branched-chain, saturated aliphatic moieties of 1 to 7 carbon atoms, such as methyl, ethyl and isopropyl. In this process, the especially preferred esters of strong acids are the lower alkyl and benzyl esters of the sulfonic acids, particularly the lower alkyl esters of paratoluenesulfonic acid, quite particularly paratoluenesulfonic acid methyl ester.

In carrying out the process of this invention, temperatures of about 100°C. to 300°C are utilized, with temperatures of about 150°C. to 250°C. being preferred. Also in this process, pressures at or above the vapor pressure of the reaction mixture at the temperature of the reaction mixture are utilized. Under the preferred conditions of the process of this invention, pressures of about 100 p.s.i.g. to about 300 p.s.i.g. are generally utilized. However, in this process, greater pressures can also be utilized, such as a pressure of up to approximately 7,000 p.s.i.g., as well as lower pressures of down to approximately 30 p.s.i.g.

The methyl-5-heptenone produced by the process of this invention can be suitably isolated from the reaction mixture in a conventional manner. It can be isolated, for example, by fractional distillation of the reaction mixture which results when the process of this invention is carried out in a homogeneous system, i.e., with one liquid phase.

In accordance with this invention, it is preferred to obtain the methyl-5-heptenone from a mixture of the pyran and the methyl-6-heptenone, produced by the procedure disclosed in Example 1 of U.S. Pat. No. 2,628,252. This mixture of the pyran and the methyl-6-heptenone is obtained by reacting isobutylene with methyl vinyl ketone at high temperatures and pressures in the presence of water. If desired, however, the pyran and the methyl-6-heptenone obtained by the process of U.S. Pat. No. 2,628,252 can be separated in a conventional manner, e.g., by fractional distillation, and converted separately to methyl-5-heptenone in accordance with the process of this application.

The process of this application can be suitably carried out in a continuous or in a batchwise manner. When carried out batchwise, the process can be suitably completed in about one to two hours.

By the process of this invention, the methyl-5-heptenone can be obtained in high yields from the pyran and the methyl-6-heptenone. Formed as a by-product of the conversion of the pyran are certain amounts of the methyl-6-heptenone. These amounts of methyl-6-heptenone, along with the quantities of the methyl-6-heptenone which have not been isomerized by the process of this application, can be recycled to subsequent batches for conversion to the methyl-5-heptenone, permitting virtually complete consumption of the pyran and/or methyl-6-heptenone starting materials.

The examples which follow further illustrate this invention. All percentages (percent) are by weight.

EXAMPLE 1

A mixture of about 86 percent 2,2,6-trimethyl-3,4-dihydropyran, about 14 percent of a low boiling, diluent mixture, containing acetone, methanol and water, and 0.033 percent paratoluenesulfonic acid (ptsa), was charged into a 75-ml. pressure bomb. Then, the bomb was immersed in an oil bath at 225°C. and held there for 15 minutes. After the 15-minute reaction time, the reaction was stopped by placing the bomb in cold water. The effluent, as analyzed by gas chromatography, contained 32.4 percent 6-methyl-6-hepten-2-one (6-MH) and 53.5 percent 6-methyl-5-hepten-2-one (5-MH). Ratio of 6-MH: 5-MH = 0.6.

EXAMPLE 2

Using the procedure of Example 1, a mixture containing 6-methyl-6-hepten-2-one (6-MH), 6-methyl-5-hepten-2-one (5-MH) and 0.02 percent pTSA was charged into a pressure bomb, kept at 220°C. for 90 min. and then quenched. The charge and the effluent were analyzed by gas chromatography. The results are summarized in Table 1.

Table 1

|  | 6-MH | 5-MH | Diluents* | Ratio of 6-MH:5-MH |
|---|---|---|---|---|
| Charge (wt.%): | 72.6 | 13.1 | 14.3 | 5.54 |
| Effluent (wt.%): | 19.7 | 65.3 | 15.0 | 0.30 |

* Diluents were principally acetone and unknown, inert impurities.

EXAMPLE 3

Using the procedure of Example 1, a mixture containing 2,2,6-trimethyl-3,4-dihydropyran (DHP), 6-methyl-6-hepten-2-one (6-MH), 6-methyl-5-hepten-2-one (5-MH) and 0.02 percent paratoluenesulfonic acid was charged into a pressure bomb kept at 220°C. for 120 min. and then quenched. The gas chromatographic analysis of the charge and the effluent is summarized in Table 2.

Table 2

|  | Acetone | DHP | 6-MH | 5-MH | Diluents** | Ratio of 6-MH:5-MH |
|---|---|---|---|---|---|---|
| Charge (wt.%): | 10.7 | 30.2 | 45.1 | 6.86 | 7.15 | 6.57 |
| Effluent (wt.%): | 11.0 | 0.4 | 19.5 | 61.2 | 7.8 | 0.318 |

** Diluents were principally acetone and unknown, inert impurities.

EXAMPLE 4

Utliizing the procedure of Example 3, a mixture containing 2,2,6-trimethyl-3,4-dihydropyran (DHP), 6-methyl-6-hepten-2-one (6-MH), 6-methyl-5-hepten-2-one (5-MH) and 0.024 percent paratoluenesulfonic acid methyl ester was charged into a pressure bomb kept at 220°C. for 12 hours and then quenched. Analysis of the charge and effluent, as analyzed by gas chromatography, is summarized in Table 3.

Table 3

|  | Acetone | DHP | 6-MH | 5-MH | Dilluents*** | Ratio of 6-MH:5-MH |
|---|---|---|---|---|---|---|
| Charge (wt. %): | 2.0 | 18.3 | 60.1 | 8.8 | 10.8 | 6.82 |
| Effluent (wt. %): | 2.1 | 0.5 | 17.5 | 63.0 | 16.9 | 0.277 |

***Diluents were principally acetone and unknown, inert impurities.

EXAMPLE 5

A feed mixture containing 21.8 percent 2,2,6-trimethyl-3,4-dihydropyran (DHP), 59.9 percent 6-methyl-6-hepten-2-one, (6-MH), 9.54 percent 6-methyl-5-hepten-2-one (5-MH), and 0.02 percent paratoluenesulfonic acid was pumped through a packed, tubular reactor, kept at 220°C. and 200 p.s.i.g. pressure. The feed rate was adjusted (ca. 10 ml./min.) to give about 2 hours of residence time. After a steady state condition was achieved, about 1,900 g. of the above mixture was pumped through the reactor.

The effluent contained 0.2–0.3 percent DHP, 25–30 percent 6-MH, and 65–60 percent 5-MH; ratio 6-MH:5-MH = 0.38–0.5.

I claim:

1. A process for obtaining 6-methyl-5-hepten-2-one, comprising heating a reaction mixture, containing:
   a. 2,2,6-trimethyl-3,4-dihydropyran, 6-methyl-6-hepten-2-one or a mixture thereof, and
   b. 0.001 to 0.5 weight percent of a strong acid selected from the group consisting of lower alkyl sulfonic acids, trifluoromethanesulfonic acid, camphorsulfonic acid, naphthalene-1-sulfonic acid, naphthalene-2-sulfonic acid, benzenesulfonic acid, p-nitrophenylsulfonic acid, 4-chlorobenzenesulfonic acid and p-toluene sulfonic acid and mixtures thereof to a temperature of 100°C. to 300°C. at a pressure at or above the vapor pressure of the reaction mixture.

2. The process of claim 1 wherein said reaction mixture is heated to a temperature of from 150°C. to 250°C.

3. The process of claim 2 wherein said reaction mixture is heated to about 220°C.

4. The process of claim 1 wherein said reaction mixture contains 0.005 to 0.2 percent by weight of said acid.

5. The process of claim 4 wherein said reaction mixture contains .01 to 0.1 percent by weight of said strong acid.

6. The process of claim 1 wherein said acid is paratoluenesulfonic acid.

7. The process of claims 1 wherein said reaction mixture consists essentially of a mixture of 2,2,6-trimethyl-3,4-dihydropyran and 6-methyl-6-hepten-2-one.

8. The process of claim 1 wherein said reaction mixture contains 2,2,6-trimethyl-3,4-dihydropyran.

9. The process of claim 1 wherein said reaction mixture contains 6-methyl-6-hepten-2-one.

* * * * *